No. 630,760. Patented Aug. 8, 1899.
E. L. WAGNER.
ROPE PULLEY.
(Application filed Nov. 29, 1898.)
(No Model.) 2 Sheets—Sheet 1.

WITNESSES:
C. E. Van Doren
Richard Paul

INVENTOR
Emil L. Wagner
BY Paul & Hawley
ATTORNEYS

No. 630,760. Patented Aug. 8, 1899.
E. L. WAGNER.
ROPE PULLEY.
(Application filed Nov. 29, 1898.)
(No Model.) 2 Sheets—Sheet 2.
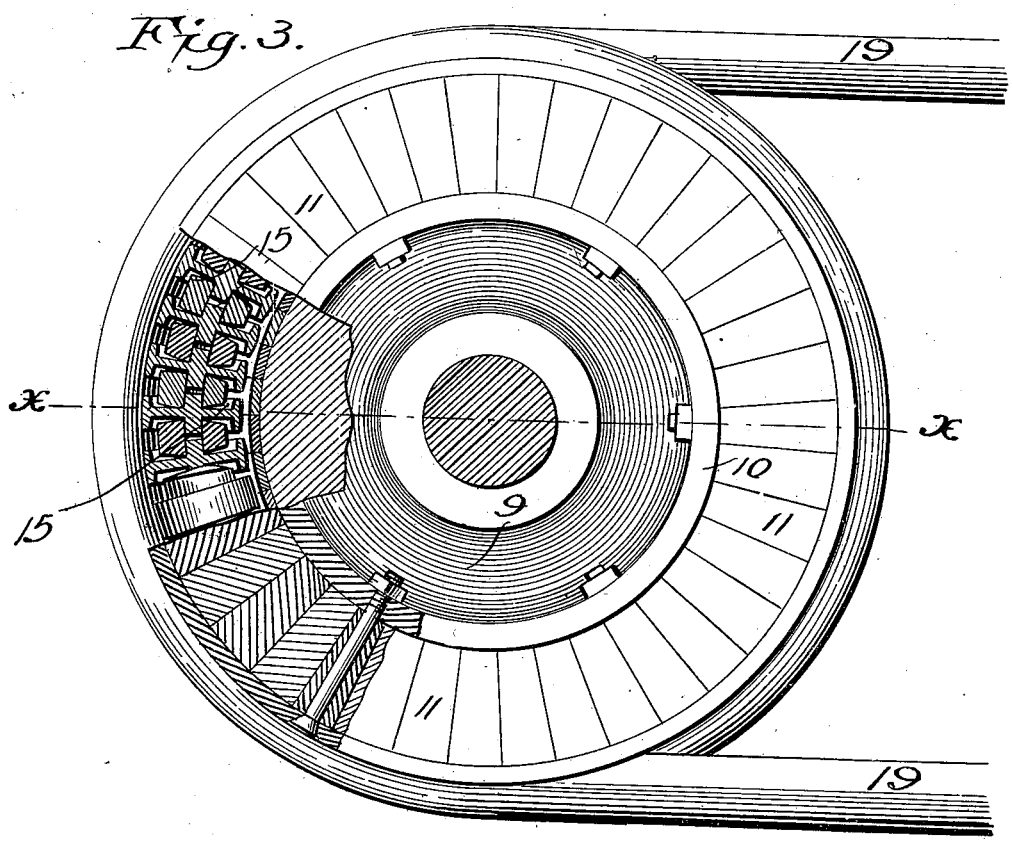
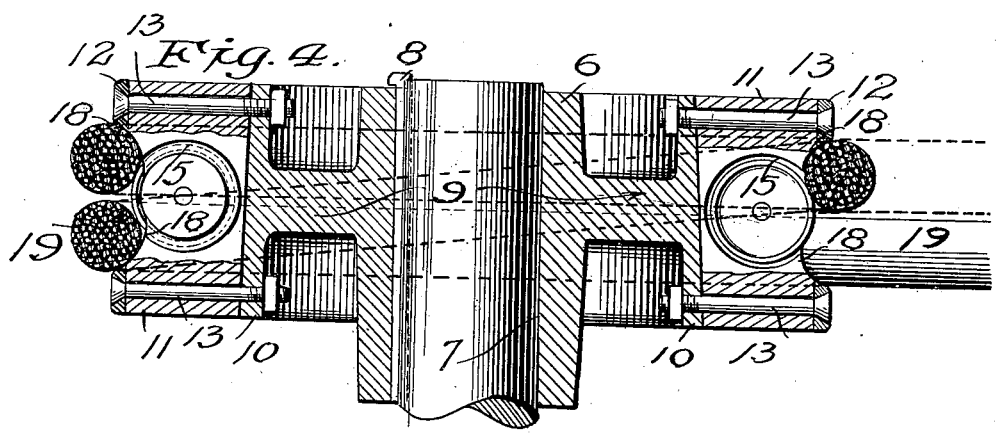
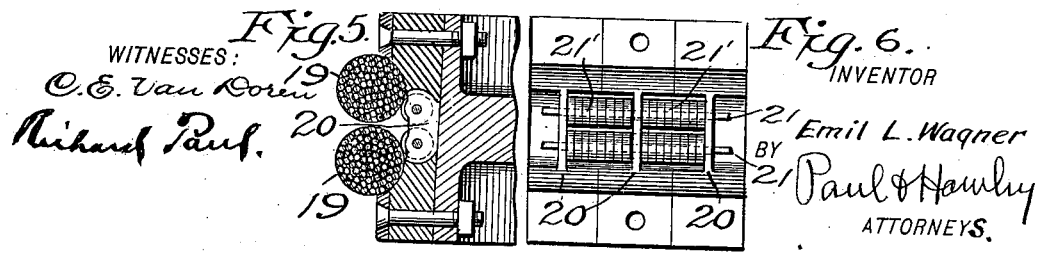
WITNESSES:
C. E. Van Doren
Richard Paul
INVENTOR
Emil L. Wagner
BY Paul & Hawley
ATTORNEYS.

UNITED STATES PATENT OFFICE.

EMIL L. WAGNER, OF ABERDEEN, SOUTH DAKOTA.

ROPE-PULLEY.

SPECIFICATION forming part of Letters Patent No. 630,760, dated August 8, 1899.

Application filed November 29, 1898. Serial No. 697,738. (No model.)

*To all whom it may concern:*

Be it known that I, EMIL L. WAGNER, of Aberdeen, Brown county, South Dakota, have invented certain new and useful Improvements in Rope-Pulleys, of which the following is a specification.

My invention relates to power-transmitting devices; and the object of the invention is to provide a pulley adapted for use in connection with a rope or cable as a means for transmitting power from an engine to a machine or from one machine to another, and the particular object of the invention is to provide a cheap but thoroughly efficient means for transmitting power from an engine to a threshing-machine, the engine being located at a considerable distance from the machine on account of the danger from fire, whereby the use of an ordinary belt is not only expensive on account of its length, but is difficult to keep on a pulley because of the high winds prevalent in prairie countries.

A further object is to provide tractive means connecting the engine and thresher in which there will be no slipping of the cable or rope, with consequent loss of power and possible damage to machinery.

A further object is to provide a pulley device whereon a rope may be run and power transmitted with a minimum amount of friction, and consequently but little wear on the rope.

The invention consists generally in a pulley, an endless rope or cable wrapped or looped around the same, and means engaging the wrap or loop to direct it across without leaving, the peripheral face of the pulley as it revolves.

Further, the invention consists in a rope or cable pulley having annular grooves on its peripheral face adapted to receive an endless rope wrapped or looped around the pulley and means engaging the wrap or loop to cause the same to travel from one groove to the other over, without leaving, the face of the pulley as it revolves.

Further, the invention consists in providing antifriction devices on the face of the pulley to engage the rope as it moves from one side of the pulley to the other.

Further, the invention consists in means for preventing the rope from running off the pulley when the engine is reversed.

Further, the invention consists in various constructions and combinations, all as hereinafter described, and particularly pointed out in the claims.

Figure 1:
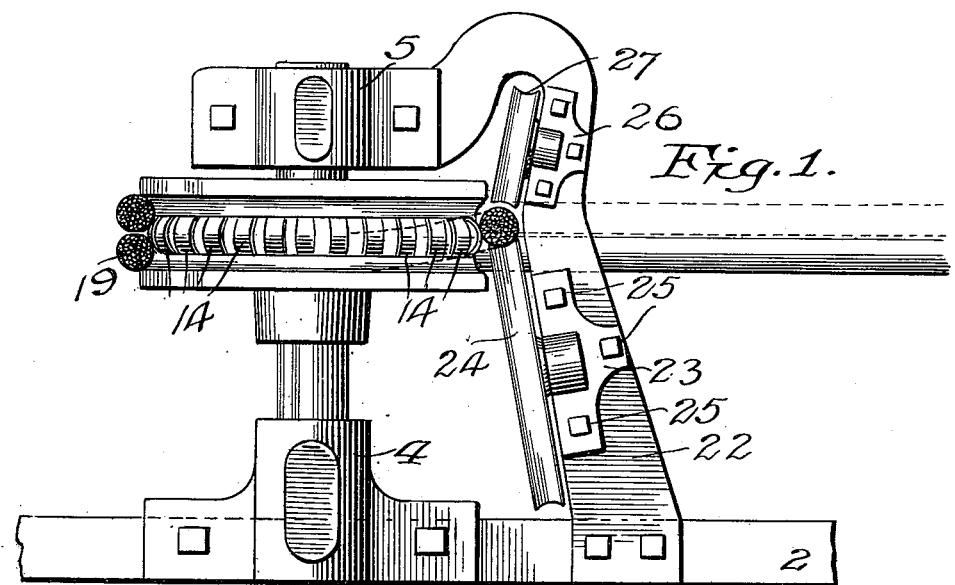
Figure 2:
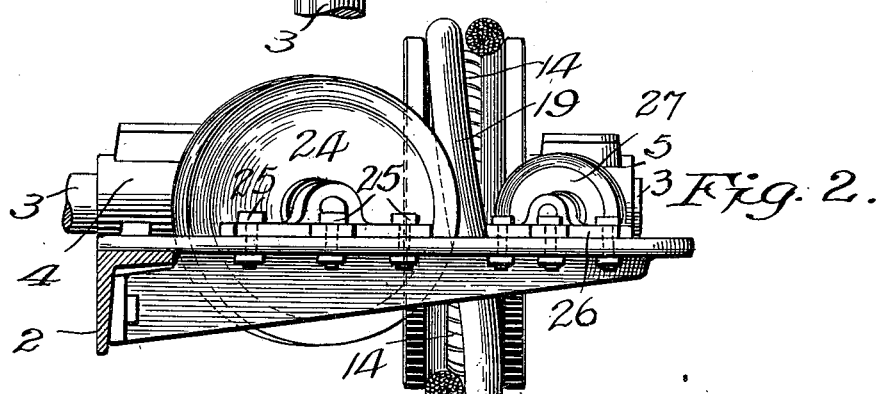
Figure 7:
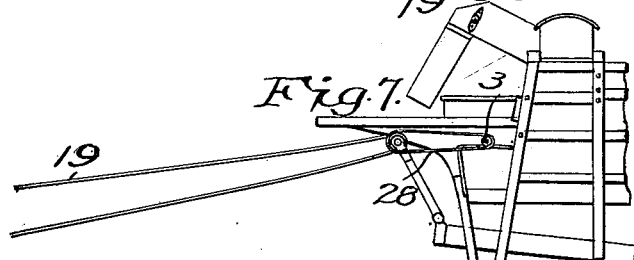
Figure 8:
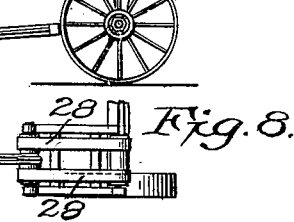

In the accompanying drawings, forming part of this specification, Figure 1 is a plan view of a pulley and its connections embodying my invention. Fig. 2 is a front view of the same. Fig. 3 is a side view of the pulley partially broken away, showing its construction at its circumference. Fig. 4 is a sectional view on the line $x\,x$ of Fig. 3. Fig. 5 is a detail sectional view showing a modified form of the antifriction devices on the face of the pulley. Fig. 6 is a plan view of the same. Fig. 7 is a view of the preferred manner of connecting the pulley to a separator-cylinder when the pulley is not placed directly on the cylinder-shaft. Fig. 8 is a plan view showing the method of connecting the pulley to the cylinder when used as shown in Fig. 7.

In the drawings, 2 represents a portion of a separator-frame; 3, the cylinder-shaft; 4, a box secured to the separator-frame 2, forming a bearing for the shaft, and 5 a similar box at the outer end of the shaft, between which and the bearing 4 the pulley hereinafter described is preferably arranged.

The pulley may be made in different ways, such as by casting it in two parts and bolting them together; but to secure the best results I prefer to build it in the following manner: A hub 6, having a central opening 7 and a long bearing-surface for the cylinder-shaft, forms the center of the pulley and is locked on the shaft by a key 8 or in any other suitable way. An annular web 9 radiates from the hub and is joined at its outer edges to a rim 10, which is preferably slightly conical in form to fit snugly within the pulley-ring, as hereinafter described. The face of the pulley is composed, preferably, of a series of iron segments or sections 11, grouped in a circle around the rim 10, one edge of each segment bearing upon the surface of said rim and being slightly tapered to compensate for the inclined surface of the rim, and thus provide a square peripheral face on the pulley. Rings 12 are provided on each side of the pulley inclosing the ends of the segments. The hub and rim 10 are driven firmly into the opening in the pulley, the tapering surface of the rim causing the segments to be firmly wedged in position between the rim and the outer rings 12, and bolts 13 are then provided at intervals in the face of the pulley, passing through the rings 12, down through the ends of the segments, and through the ends of the rim 10, thereby securing the parts firmly together.

It has been found that there is not sufficient friction in passing a rope or cable over a pulley in the same manner that a belt is used to transmit power from an engine or from one machine to another, and for this reason it is not practicable ordinarily to use a rope or cable for transmitting power, as the rope would slip on the pulley and most of the force would be lost. It is desirable, therefore, to make a wrap or loop around the pulley in order to increase the frictional surface and prevent slipping; but it has been found that when this was done each time the pulley revolved the endless rope or cable would be moved a distance equal to the diameter of the rope to one side or the other, depending upon the direction that the pulley was revolving, until the rope passed entirely off the end of the pulley. It is therefore necessary to provide some means for retaining the rope on the pulley as it revolves. I therefore provide a bracket 22, having one end secured to the separator-frame 2, and, passing in front of the pulley, is secured at its other end to the box 5, as shown in Fig. 1. Upon this bracket 22 I provide a small casting 23, having a bearing for the stud-shaft of the groove-faced wheel 24, said casting being secured to the bracket 22 by bolts 25, passing through holes in the casting, which are considerably larger than the diameter of said bolts to permit the wheel 24 to be adjusted at different angles to the pulley. This wheel 24 is arranged so that it will engage the loop or wrap of the rope 19 that is passed around the pulley and will direct it diagonally across without leaving the face of the pulley from one side to the other, or, if grooves are provided in the face of the pulley, from one groove to the other as the pulley revolves. This diagonal sliding or rubbing movement on the face of the pulley would, however, soon wear out or fray the rope, and some means must therefore be provided for eliminating as far as possible the friction between the loop and the face of the pulley as the loop travels across it. I therefore provide a series of antifriction rollers or wheels 14 in the peripheral face of the pulley, so that as the loop of the rope engages the wheel 24 and travels with a sliding or rubbing movement diagonally over the face of the pulley it will engage a series of rollers 14, which turning on their axes will prevent the loop from being worn by a rubbing contact with the face of the pulley. These rollers or wheels 14 are preferably arranged in a continuous circle in the face of the pulley, there being preferably one roller between each pair of segments, and in order that the rollers may be held firmly in position in the face of the pulley, though freely revoluble in their bearings, I provide a recess 15 in both sides of each segment and a boss 16, having a central opening 17 to receive the ends of the short studs provided on the rollers or wheels and on which the rollers revolve substantially at right angles to the cylinder-shaft.

The faces of the wheels or rollers project slightly above the face of the pulley, forming a low annular ridge, preferably in the center of the face, separating the sections of rope and preventing them from rubbing together and at the same time forming an antifriction-surface whereon the looped portion slides as it crosses the face of the pulley. While I prefer to use the annular series of wheels or rollers, I may dispense with them and provide an annular ridge in the face of the pulley sufficient to keep the sections of rope apart and forming a comparatively smooth surface for the loop to slide over as it crosses the face of the pulley. Upon each side of the antifriction-rollers 14 I prefer to provide shallow annular grooves 18 in the face of the pulley to receive the sections of a rope or cable 19 that are passed with one single loop or wrap around the same. Instead of providing a single row of rollers or wheels in the middle of the face of the pulley I may provide bridges 20 in the outer ends of the segments and between the bridges extending around the circumference of the wheel arrange parallel wires or rods 21, upon which are strung between each pair of bridges two rows of washers 21', adapted to turn upon the rods or wires as an axis in a direction substantially at right angles to the axis of the pulley. The outer edges of these washers project above the face of the pulley or above the bottoms of the grooves or depressions in the same manner as described with reference to the wheels 14 and engage the loop of the rope 19 wrapped around the pulley. Instead of arranging two wires in the peripheral surface of the pulley to support two rows of washers I may provide but one wire in the center of the peripheral face of the pulley, arranging thereon a single row of washers to take the place of the antifriction rollers or wheels heretofore described. It being sometimes necessary or desirable to reverse the direction of the pulley, I also provide a block or casting 26, carrying a small groove-faced pulley or wheel 27 upon the opposite side of the pulley from the wheel 24 in position to engage the rope upon that side of the pulley and prevent it from running off when the pulley is reversed.

In Figs. 1 and 2 the pulley is shown secured directly upon the cylinder-shaft. It may be desired, however, to drive the cylinder at a greater speed than the pulley. I may therefore arrange the pulley in advance of the cylinder and support it in any suitable way upon the separator-frame, as shown in Fig. 7, a wider-faced pulley being used, and belts 28 being provided to connect it with the cylinder-shaft, the rope 19 being wrapped or looped around the pulley in the manner heretofore described.

It will be observed from an examination of the drawings, particularly Fig. 2, that the loop of the rope passes through a wide arc in crossing the face of the pulley, and consequently makes no sharp bends or curves which would cause undue friction and wear upon the rope. It will also be observed that the looped portion does not come in contact with the other sections as it passes over the face of the pulley, and its engagement with the face of the wheel 24 is just sufficient to insure its being directed over the center of the antifriction-rolls to the opposite side of the pulley from whence it started.

While I have shown and described the rope-pulley embodying my invention used in connection with a threshing-machine, I do not confine myself to this use of the invention, for while it is particularly adapted for transmitting power from an engine to the cylinder of a threshing-machine it may with equally good results be used wherever it is desired to convey power through the medium of a rope or cable and pulleys.

Having thus described my invention, I claim as new and desire to secure by Letters Patent—

1. The combination, with a pulley, of an endless rope having a loop or wrap around the peripheral face of the pulley, and means engaging the loop to direct it across, without leaving, the face of the pulley as the pulley revolves, substantially as described.

2. The combination, with a pulley, of an endless rope or cable having a loop or wrap around the peripheral face of the pulley, antifriction devices provided in the peripheral face of the pulley and means engaging the loop or wrap to direct it across, without leaving, the face of the pulley and over the antifriction devices therein as the pulley revolves, substantially as described.

3. The combination, with a pulley, of an endless rope or cable having a loop or wrap around the peripheral face of the pulley, antifriction rollers or wheels arranged in a circle in the face of the pulley with their axes substantially at right angles to the axis of the pulley, and means engaging the loop to direct it across the face of the pulley, without leaving the same, as the pulley revolves, substantially as described.

4. The combination, with a pulley, of an endless rope or cable having a loop or wrap around the peripheral face of the pulley, antifriction devices provided in the face of the pulley, and means engaging the loop to direct it across the face of the pulley and over the antifriction devices therein as the pulley revolves, substantially as described.

5. The combination, with a pulley, of an endless rope having a loop or wrap around the peripheral face of the pulley, a series of wheels or rollers provided in the face of the pulley and forming a continuous circle therein, the axes of said wheels or rollers being substantially at right angles to the axis of the pulley, and means engaging the loop or wrap to direct it across the face of the pulley and over the antifriction devices therein as the pulley revolves, substantially as described.

6. A rope-pulley, having annular grooves or depressions in its peripheral face, an annular rib or ridge between said grooves or depressions, an endless rope or cable looped or wrapped around the peripheral face of the pulley in said grooves or depressions, and means for directing the loop or wrap in the rope across, without leaving, the face of the pulley over the annular rib or ridge from one groove to the other as the pulley revolves, substantially as described.

7. A rope-pulley, having annular grooves in its peripheral face, antifriction devices between said grooves and extending around the face of the pulley, an endless rope or cable looped or wrapped around the pulley and resting in said grooves or depressions, and means engaging the loop or wrap to direct it from one groove to the other, across, without leaving, the face of the pulley over the antifriction devices therein, substantially as described.

8. A rope-pulley, having annular grooves in its face, antifriction rollers or wheels arranged between said grooves and projecting above the bottoms of the same, forming an annular rib or ridge between the grooves, the axes of said rollers or wheels being substantially at right angles to the axis of the pulley, an endless rope or cable looped or wrapped around the pulley, and means engaging the loop or wrap to be directed across the face of the pulley over the antifriction-rollers therein, substantially as described.

9. The combination, with a pulley, of an endless rope having a loop or wrap around the peripheral face of the pulley, antifriction wheels or rollers arranged in the face of the pulley and having their axes substantially at right angles to the axis of the pulley and an antifriction-roller arranged in position to engage the loop or wrap and direct it across the face of the pulley over the antifriction wheels or rollers therein as the pulley revolves, substantially as described.

10. The combination, with a pulley, of an endless rope or belt having a loop or wrap around the peripheral face of the same, antifriction-rollers provided in the face of the pulley and forming a circle therein, means engaging the loop or wrap to direct it across the face of the pulley over the antifriction-rollers therein as the pulley revolves to prevent the rope from running off the pulley when the engine is going ahead, and means engaging the loop to prevent the rope from running off the pulley when the engine is reversed, substantially as described.

11. A rope-pulley, having annular grooves or depressions in its surface, antifriction-rollers mounted in the face of the pulley between said grooves and projecting above the bottoms of the same, an endless rope or cable wrapped around said pulley in said grooves, and an antifriction wheel or roller arranged in position to engage said loop to direct it over said antifriction-rollers from one groove to the other, without leaving, the face of the pulley as it revolves, substantially as described.

12. A rope-pulley, having annular grooves or depressions in its surface, antifriction-rollers mounted in the face of the pulley, between said grooves and projecting above the bottoms of the same, an endless rope or cable wrapped around said pulley in said grooves, an antifriction-roller 24 arranged in position to engage the loop, or wrap of the rope to direct the same over said antifriction-rollers from one groove to the other, without leaving, the face of the pulley as it revolves, and a second antifriction-roller, also arranged in position to engage said loop or wrap, substantially as described.

13. A rope-pulley comprising a hub having a central opening, a tapered or conical rim concentric with said hub, an annular web connecting said hub and said rim, a series of sections or segments arranged outside of said rim, their outer edges forming the peripheral face of the pulley, means securing said sections or segments to said rim, a series of antifriction-rollers having bearings in said segments, their faces projecting above the face of the pulley and their axes being substantially at right angles to the axis of the pulley, substantially as described.

14. A rope-pulley, having a series of antifriction devices in its peripheral face, said devices projecting above the face of the pulley and having their axes substantially at right angles to the axis of the pulley, substantially as described.

15. A rope-pulley, having a series of antifriction-rollers arranged in a circle extending around its peripheral face, said rollers projecting above the face of the pulley and having their axes substantially at right angles to the axis of the pulley, and annular grooves or depressions provided in the peripheral face of the pulley upon either side of said antifriction-rollers, substantially as described.

In witness whereof I have hereunto set my hand this 26th day of November, 1898.

EMIL L. WAGNER.

In presence of—
RICHARD PAUL,
M. C. NOONAN.